Oct. 20, 1964 S. A. PROCTER 3,153,728
WELDING CONTROL APPARATUS
Filed March 30, 1960 3 Sheets-Sheet 1

INVENTOR.
SAMUEL A. PROCTER
BY Ooms, McDougall,
Williams & Hersh
ATTORNEYS

United States Patent Office 3,153,728
Patented Oct. 20, 1964

3,153,728
WELDING CONTROL APPARATUS
Samuel A. Procter, Minneapolis, Minn., assignor to
Elmer Hankes, Minneapolis, Minn.
Filed Mar. 30, 1960, Ser. No. 18,564
15 Claims. (Cl. 307—31)

This invention relates to electrical control systems and pertains particularly to apparatus for controlling the operation of welding machines.

Industrial use of electrical resistance welding machines is very widespread. Such machines are often known as spot welding machines. They are commonly used for welding sheet metal parts together. In the operation of welding machines of this type, work pieces are clamped together between a pair of electrodes. Welding current is then passed through the work pieces between the electrodes. The current is sufficient to bring about localized melting or softening of the metal in the work pieces. The weld is formed by this melting or softening action, together with the pressure exerted by the electrodes. After the welding current has been turned off, the work pieces are held together by the electrodes until the softened metal has rehardened. It is commonplace for an industrial plant to employ such electrical resistance welding machines in a group or battery, containing a large number of the machines.

Any installation of a group of electrical resistance welding machines requires an adequate electric power supply, if the welding machines are to perform their designated jobs properly, and at the scheduled speed. Whenever such a group of welders is operated on a production basis, a moderate voltage drop and moderate voltage fluctuations are normal, yet the welding machines generally function properly, because the design of such machines allows for a moderate voltage drop.

Occasionally, however, an excessive number of welding machines may operate with overlapping welding intervals. When this happens, the voltage drop on the power line may become excessive or even intolerable. Lights may blink throughout the plant, or even in the surrounding neighborhood. Some sensitive business machines or other equipment may be caused to malfunction. Worst of all, however, the welding machines may produce bad welds. In a situation of excessive voltage drop, a spot welder will develop insufficient welding current to generate the amount of heat which is necessary to properly melt and fuse the metal being welded. The welded parts may be jointed together insecurely, so that they may be pulled apart easily. When such bad welds are discovered, the welded parts will have to be rejected or repaired. If the bad welds escape detection in the course of normal inspection, the welded parts may cause trouble to customers in the field. This results in embarrassment and costly repairs or replacements.

One object of the present invention is to prevent situations in which too many welding machines are switched on to the power line simultaneously or with overlapping welding cycles. In this way, excessive voltage drop on the power line is prevented. The present invention provides a new and improved control system which continuously monitors the power line voltage and holds the welding machines off the power line during momentary downward fluctuations of the line voltage, below a desired minimum level. Usually, no welding machine is delayed more than a fraction of a second in coming onto the power line to begin its welding cycle. Thus, the present invention does not cause any substantial loss of production time. However, the present invention does maintain the quality of the welds, while preventing excessive voltage fluctuations.

A further object of the present invention is to provide a new and improved control system whereby the firing of any one welding machine will prevent all of the other machines in the group from firing for a very brief interval, which, for example, may amount to only two cycles of the 60 cycle power line frequency. This very brief delay is sufficient to provide for dissipation of the switching transients which occur when the welding cycle of a welding machine is initiated. After this brief delay, other welding machines may successively come onto the power line with overlapping welding cycles, provided that the line voltage does not drop below the desired minimum value.

Another object is to provide a welding control system in which each welding machine is provided with an adjustable control for varying the minimum level of line voltage at which the machine will come onto the line. Thus, each machine is assured of producing good welds. Within the limitation of the necessity for producing good welds, these controls may also be employed to assign relative priorities to the various welding machines. Thus, a machine with a low voltage setting will take priority over a machine with a relatively high voltage setting, under conditions in which the line voltage is somewhat depressed. Thus, a high speed production machine may be given priority over a low speed machine, so that important production time will not be lost.

Further objects and advantages of the present invention will appear from the following description, taken with the accompanying drawings, in which:

FIG. 4 is a diagram representing the wave form of the squeeze control timer output for each of the welding machines employed in the system.

It will be convenient to explain the nature of the present invention with relation to a welding control system involving a plurality of welding machines. However, it must be realized that the invention is applicable to various other welding control systems. Moreover, the invention is applicable to other types of electrically operated devices or machines, as to which a minimum power line voltage is necessary to insure satisfactory operation.

Figure 1:
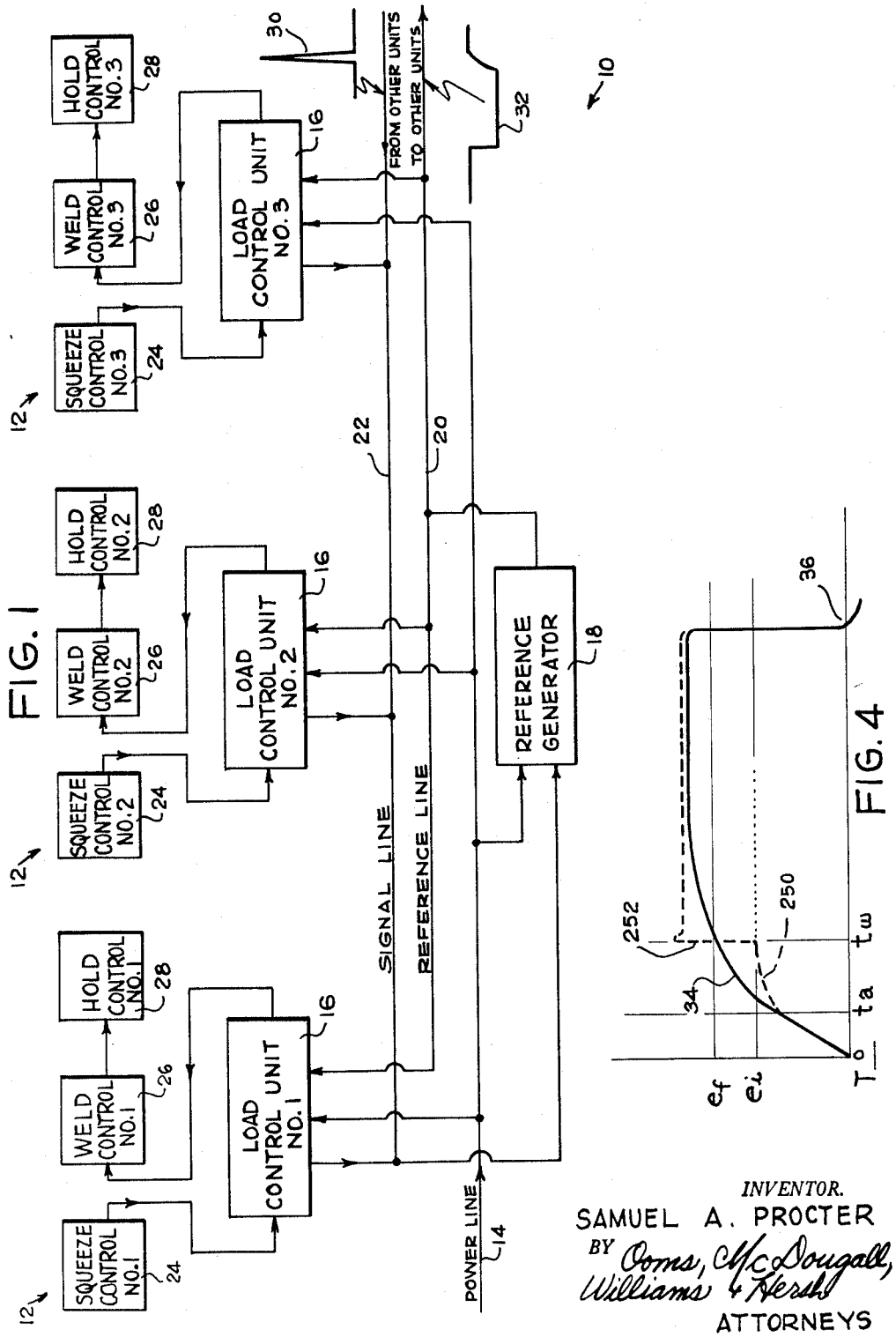
FIG. 1 is a block diagram of a welding control system to be described as an illustrative embodiment of the present invention.

The block diagram of FIG. 1 illustrates a welding control system 10 which may be employed in connection with any desired or suitable number of welding machines. FIG. 1 specifically illustrates three welding machines 12.

The welding machines 12 are adapted to receive their input of power from a power line 14, which may be adapted to supply alternating current at 440 volts and 60 cycles, or some other convenient voltage or frequency. Each welding machine 12 has a load control unit or device 16, which continuously monitors the power line voltage, with reference to a reference voltage produced by a reference generator 18. The reference voltage is stabilized to a high degree, so that it is not subject to variation due to fluctuations in the power line voltage. A reference line 20 is provided to transmit the reference voltage from the reference generator 18 to all of the load control units 16. Each load control unit 16 will hold the corresponding welding machine off the line if the power line voltage is momentarily insufficient to produce a good weld.

When the welding cycle of any one of the welding machines 12 is initiated, the corresponding load control unit 16 produces a lockout signal which is employed to impose a slight delay before any other welding machine can come onto the power line with its welding cycle. The load control units 16 deliver their lockout signals to a signal line 22 which preferably is arranged to carry the lockout signals to the reference generator 18. A lockout pulse may then be superimposed upon the reference voltage so that the lockout pulse will be carried to all of the other load control units. This lockout pulse may last for only about two cycles of the 60 cycle power line frequency. After this very brief delay, another welding machine can initiate its welding cycle. This slight delay is sufficient to provide for the dissipation of any surges or switching transients caused by the initiation of the welding cycle of one welding machine.

In this case, each welding machine 12 comprises a control arrangement including a squeeze timer and control 24, a weld timer and control 26, and a hold timer and control 28. The squeeze control 24 provides an initial interval during which the work pieces are squeezed between the welding electrodes. This assures that the work pieces will be firmly pressed together and that their mechanical position will have stabilized before the welding cycle is begun. The squeeze interval may be of any suitable length, such as from 10 to 60 cycles of the alternating current, for example. The squeeze timer control 24 provides an output signal which initiates the cycle of the welding timer control 26. At the beginning of its cycle, the welding control 26 initiates the flow of welding current. After the desired welding interval, the welding control 26 turns off the welding current. The hold timer control 28 then maintains the pressure between the welding electrodes for a sufficient interval to permit the melted or softened metal to solidify. At the end of the welding cycle, the weld timer 26 provides a signal which initiates the operation of the hold timer control 28.

It will be seen that the load control unit 16 is interposed between the squeeze control 24 and the weld control 26. Thus, the squeeze control directs its actuating signal to the weld control 26 through the load control unit 16. If the voltage on the power line 14 is above the minimum level, and if no lockout pulse is then being received by the load control unit, the actuating signal will pass through the load control unit 16 to the weld control 26 without any substantial delay. If the power line voltage is momentarily below the minimum level, the load control unit will delay the squeeze control output signal until the line voltage rises above the minimum level. If a lockout pulse is being received, the load control unit will delay the transmission of the squeeze output signal until the end of the lockout pulse. The lockout pulse may be very short. Thus, for example, it may amount to only two cycles of the 60 cycle alternating current.

The lockout triggering or initiating signal produced by the load control unit 16 may be in the form of sharp spikes 30, as shown in the oscillogram adjacent the signal line 22 in FIG. 1. The reference generator 18 may be arranged to produce a wider lockout pulse 32, superimposed on the reference voltage, in response to each spike 30.

The output signal from the squeeze control timer 24 may assume various forms. Thus, such output signal may simply take the form of an on-off signal. More often, however, the squeeze output signal increases in value over a period of time until the magnitude of the signal becomes sufficient to fire the weld control timer 26. Thus, the illustrated control system is adapted to be employed in connection with a known timer having a gradually rising wave form 34 represented in full lines in FIG. 4. The rising portion of this wave form 34 will be recognized as being typical of the rise of voltage across a condenser when the condenser is being charged through a resistor from a source of fixed voltage. Eventually the squeeze output voltage drops off to zero or even goes negative, as shown at 36 in FIG. 4, but this does not occur until after the cycle of welding has been completed. When the squeeze output voltage rises to a predetermined level, designated $e_f$ in FIG. 4, the weld control timer 26 will be fired.

As already indicated, the reference generator 18 is adapted to produce a stable reference voltage which will be free from any substantial variation due to fluctuations in the power line voltage. Of course, a battery could be employed to provide such a stable voltage. However, for greater convenience and serviceability, the illustrated reference generator 18 comprises a regulated power supply 40. The output of the power supply 40 is in the form of direct current, in this case, although such output might in some cases be in the form of alternating current.

Any suitable circuit may be employed in the regulated power supply 40. The illustrated circuit is entirely conventional. It is adapted to produce a negative stabilized potential of perhaps 180 volts or the like between a lead 42 and ground.

It will not be necessary to describe the regulated power supply 40 in detail. Those skilled in the art will recognize the power supply as being of the type employing a power transformer 44, a full wave rectifier tube 46 to rectify the output of the transformer 44, a power tube 48 connected to act as a variable resistance in series with the output of the rectifier 46, a tube 50 connected to the tube 48 as a negative feedback direct current amplifier, and a two-element gas tube 52 to stabilize the voltage between the cathode of the tube 50 and the lead 42. The direct current amplifier tube 50 derives its grid voltage from a potentiometer 54 which is connected in series with voltage divider resistors 56 and 58 across the direct current output of the power supply. The potentiometer 54 may be changed to vary the reference voltage.

Figure 2:
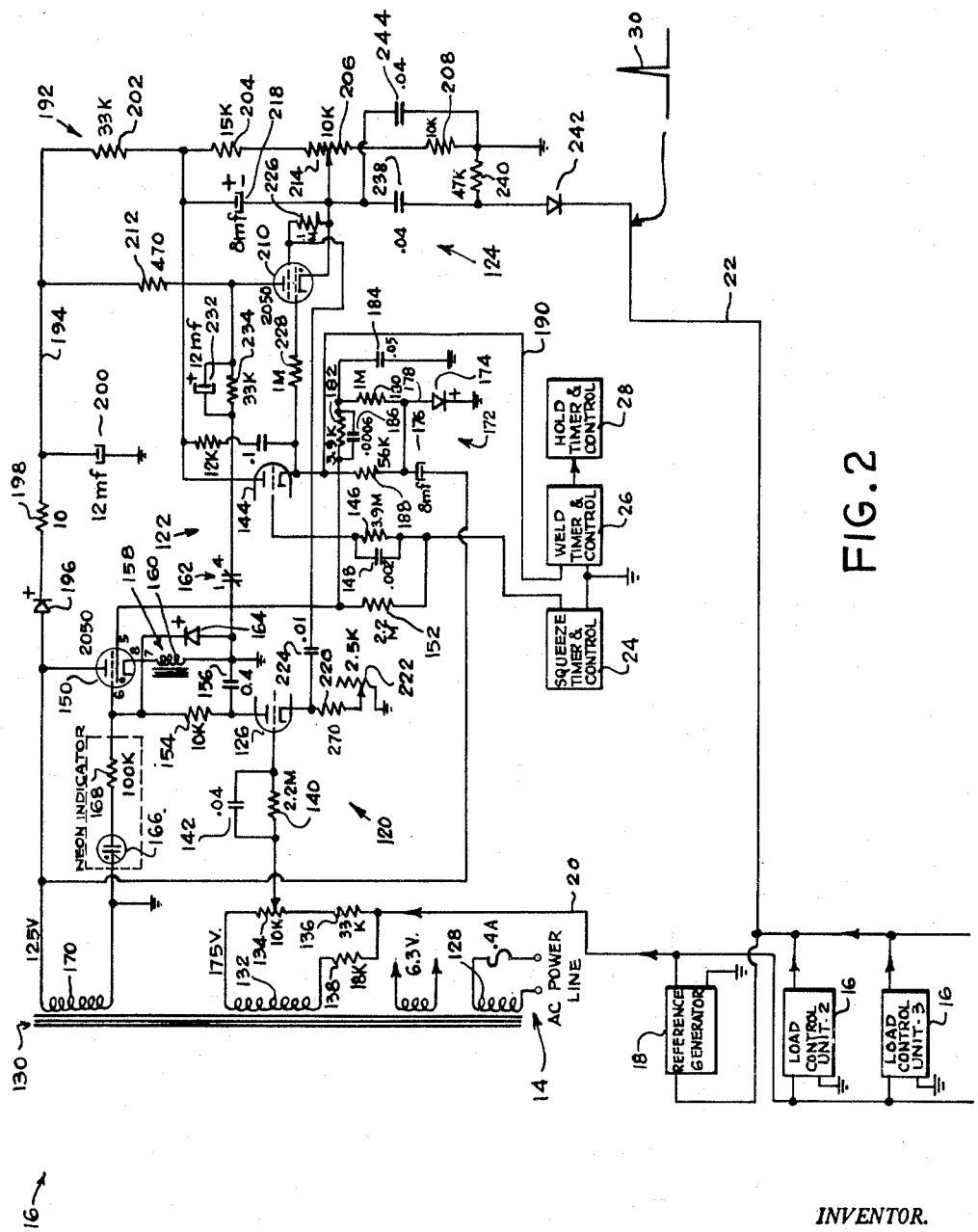
FIG. 2 is a circuit diagram showing further details of the load control units employed in the welding control system.
Figure 3:
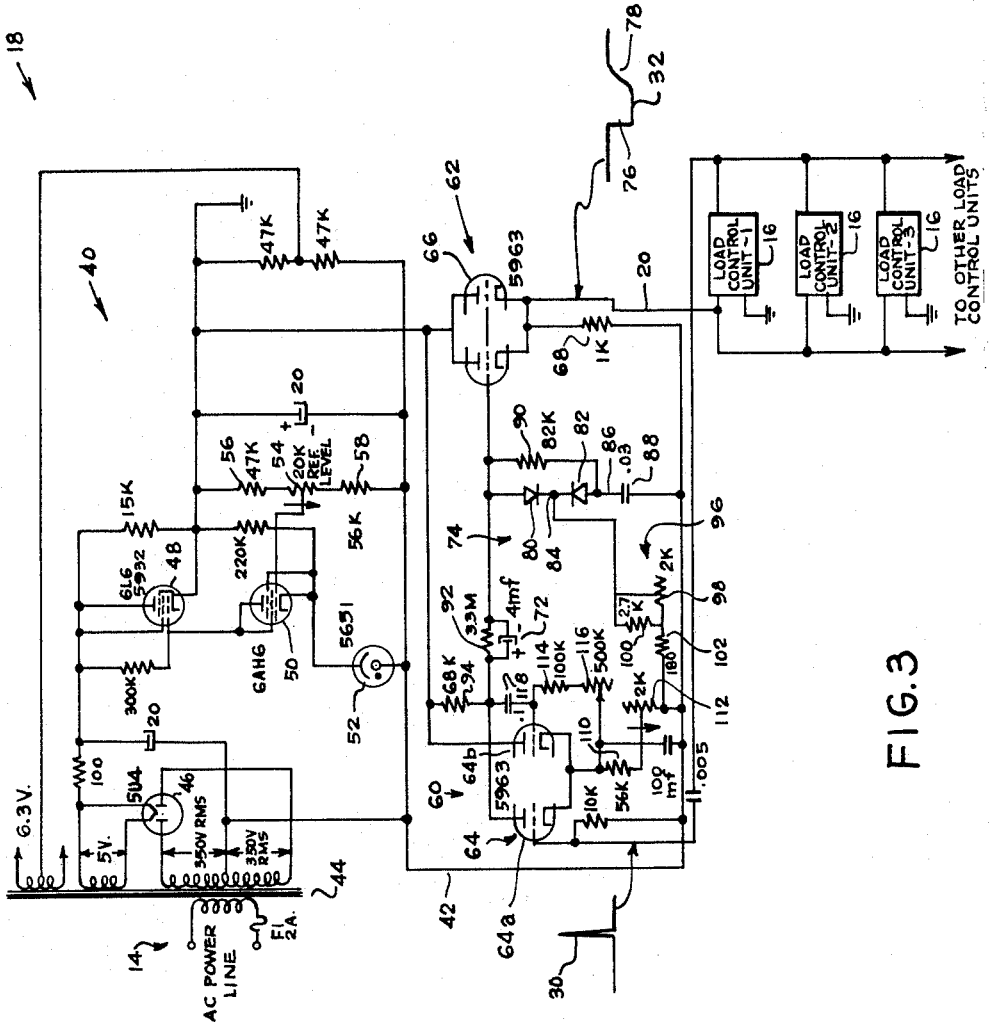
FIG. 3 is a circuit diagram showing further details of the reference generator employed in the welding control system.

One set of possible values for the various components of the system is given in FIGS. 2 and 3. Of course, these values are given merely by way of example, without imposing any limitation upon the scope of the present invention.

As illustrated, the reference generator 18 comprises a pulse generator 60 which is adapted to generate the lockout pulse 32, in response to the spike type triggering signals 30 from the load control units 16. A modulator circuit 62 is employed to superimpose the lockout pulses 32 upon the reference voltage. It will be realized, however, that the lockout pulse 32 could readily be routed separately to the load control units, rather than being superimposed upon the reference voltage.

The trigger circuit or pulse generator 60 may be entirely conventional in construction. As shown, the pulse generator 60 comprises a conventional one shot multi-vibrator, utilizing both units of a double triode tube 64.

The modulator circuit 62 employs a double triode tube 66 with both units connected in parallel. An output resistor 68 is connected between the negative reference voltage lead 42 and the reference line 20. The cathodes of the double triode 66 are connected directly to the reference line 20, while the plates are connected directly to ground, which is the positive terminal of the stabilized power supply 40. When the double triode 66 is cut off, there is no substantial drop across the resistor 68, because the cathode current in the tube 66 is zero, and there is no substantial current through the reference line to the load control units. Normally, however, in the absence of a lockout pulse, the double triode 66 is conducting, so that there is cathode current through the output resistor 68. This produces a substantial drop through the resistor 68, so that the reference voltage is somewhat less than the total output voltage from the stabilized power line 40.

Each lockout pulse 32, from the multi-vibrator 60, cuts off the double triodes 66, so that the reference voltage is pulsed to a higher value for the duration of the lockout pulse.

The output of the multi-vibrator 60 is coupled to the grids of the double triodes 66 by a capacitor 72. A pulse shaping circuit 74 is connected to the grids of the double triode 66, so that the lockout pulse 32 will have a steeply rising negative going initial portion 76, while having a rather gently sloping positive going trailing portion 78. This pulse shaping circuit 74 comprises two diodes 80 and 82, connected back to back. The diode 80 is polarized to conduct from the grids of the double triode 66 to the junction lead 84, while the diode 82 is polarized to conduct between a lead 86 and the lead 84. A condenser 88 is connected between the lead 86 and the negative power lead 42. It will be seen that a charging resistor 90 is connected between the grids of the double triode 66 and the lead 86.

The diodes 80 and 82 are biased by currents drawn through a high value resistor 92 which is shunted across the coupling capacitor 72. Thus, the resistor 92 is connected between the grids of the double triode 66 and the plate of the left-hand unit of the double triode 64. Such plate is connected to ground through the output resistor 94 of the multi-vibrator 60. Biasing current is drawn from the junction lead 84 between the diodes 80 and 82 by a resistor network 96 which includes three resistors 98, 100 and 102. The resistors 98 and 100 are connected in parallel with each other. It will be seen that this parallel combination is connected in series with the resistor 102. The entire resistor network 96 is connected between the lead 84 and the negative reference voltage lead 42. It will be seen that the resistor 98 is variable to change the bias on the diodes 80 and 82. This varies the amplitude of the lockout pulses.

The arrangement of the diodes 80 and 82 permits the negative lockout pulses from the multi-vibrator 60 to drive the grids of the double triode 66 very quickly in a negative direction, while retarding the return of the grid voltage in a positive direction at the trailing portions of the pulses. This produces the illustrated shape of the lockout pulses 32, with the steep negative going initial portion 76 and the gradually sloping, positive going trailing portion 78. The gradually sloping trailing portion 78 prevents the generation of unwanted spikes or other transients in the load control unit.

It will not be necessary to describe the one shot multi-vibrator 60 in any detail, because it is conventional in construction. It will be enough to note that multi-vibrator 60 comprises two triodes 64a and 64b, constituting the two units of the double triode 64. The triode 64a is normally cut off, or nearly so, while the triode 64b is normally conductive. The cathodes of the two triodes are connected together. Resistors 110 and 112 are connected in series between the cathodes and the negative power lead 42. The triode 64a is normally cut off by the voltage due to the cathode current of the triode 64b, flowing through the resistors 110 and 112. The resistor 112 is variable so that the initial bias on the triode 64a may be varied to change the sensitivity of the trigger circuit to input pulses.

Resistors 114 and 116 are connected in series between the grid and the cathode of the triode 64b. A coupling capacitor 118 is connected between the plate of the triode 64a and the grid of the triode 64b. The duration of the single shot pulses produced by the multi-vibrator depends to a large extent upon the time constant represented by the condenser 118 in conjunction with the resistors 114 and 116. It will be seen that the resistor 116 is variable, so that the duration of the lockout pulses may be changed.

The reference voltage from the reference generator 18 is supplied to each of the load control units 16. As shown in FIG. 2, each load control unit 16 comprises a comparator device or circuit 120 which continuously monitors the voltage on the power line 14 and compares the power line voltage with the stabilized reference voltage. The output of the comparator circuit 120 is applied to an electronic switch circuit or device 122 which controls the transmission of signals from the squeeze control timer 24 to the weld control timer 26. When the power line voltage is sufficient, with relation to the reference voltage, the electrically operable switching arrangement 122 is rendered capable of transmitting the output of the squeeze timer 24 to the weld timer 26 so that the welding cycle will be initiated at the conclusion of the squeeze cycle.

Each load control unit 16 also comprises a pulse generating circuit 124 which produces a signal when the welding cycle is initiated. As already described, this signal is transmitted to the reference generator 18 and is employed to lockout the operation of the other load control units 16 for a brief interval, so as to provide for the dissipation of surges, switching transients and the like, caused by the initiation of the welding cycle.

In this case, the comparator circuit 120 comprises an electronic device in the form of a triode 126. The negative reference voltage on the reference line 20 is employed to bias the grid of the triode 126. The power line voltage is applied to the primary 128 of a transformer 130 which has a secondary 132 connected to the grid of the triode 126. The alternating current output of the secondary 132 is in series with the reference voltage and thus is superimposed thereon.

Voltage divider resistors 134, 136 and 138 are connected in series across the secondary winding 132. The resistor 134 is in the form of a variable potentiometer having its movable contact connected to the grid of the triode 126 through a high value resistor 140 which limits the grid current in the triode 126. A coupling capacitor 142 is connected across the resistor 140. It will be seen that the reference voltage line 20 is connected to the junction between the resistors 136 and 138. Thus, the reference voltage, between the reference line 20 and ground, is effectively connected in series with the alternating voltage derived from the transformer secondary 132. The alternating voltage component applied to the grid of the triode 126 may be varied by adjusting the potentiometer 134. This adjustment establishes the minimum power line voltage at which the welding cycle can be initiated by the output voltage from the squeeze timer 24.

It will be seen that the output voltage from the squeeze timer 24 is applied to the electronic switching arrangement 122. In this case, the electronic switch 122 comprises an electronic device in the form of a triode 144. The output of the squeeze timer 24 is applied to the grid of the triode 144 through a high value resistor 146 which limits the grid current in the triode. A small coupling capacitor 148 is connected across the resistor 146.

To control the operation of the voltage comparator 120, the output of the squeeze timer is also applied to an electronic device in the form of a Thyratron gaseous discharge tube 150. It will be seen that the output of the squeeze timer 24 is connected to the grid of the Thyratron 150 through a high value resistor 152. The operation of the Thyratron 150 controls the application of plate voltage to the voltage comparator triode 126. Thus, the plate of the triode 126 is connected to the cathode of the Thyratron 150 through a filtering resistor 154. A filtering capacitor 156 is connected between the plate of the triode 126 and ground. The triode 126 derives its plate voltage from the cathode of the Thyratron 150. The Thyratron 150 is also effective to operate a relay 158 having its coil 160 connected between the cathode of the Thyratron 150 and ground. The relay 158 has a pair of normally closed contacts 162 which are connected into the circuit of the electronic switch 122 in a manner to be described presently. A reversely connected diode 164 is connected across the relay coil 160 to slow down the release characteristic of the relay. To indicate when the Thyratron 150 is conducting, a neon or other gaseous lamp 166 is connected between the cathode of the Thyratron 150 and ground, with a current limiting resistor 168 in series with the lamp. The shield grid of the Thyratron 150 may be connected to the cathode thereof.

The transformer 130 has a secondary winding 170 which is connected between the plate of the Thyratron 150 and ground. Thus, alternating current is applied to the plate of the Thyratron.

A biasing circuit 172 is provided to apply a negative biasing voltage to the grid of the Thyratron 150. It will be seen that the biasing circuit 172 comprises a diode 174 which is connected in series with a filter capacitor 176, across the secondary winding 170. Specifically, the positive terminal of the capacitor 176 is connected to the plate of the Thyratron 150, which is connected to the ungrounded side of the transformer winding 170. The negative side of the capacitor 176 is connected to a lead 178 which extends to the diode 174. The other side of the diode is connected to ground. It will be seen that the diode 174 is polarized so as to conduct between the lead 178 and ground. Thus, a negative potential develops on the lead 178. A portion of this negative potential is applied to the grid of the Thyratron 150 through high value resistors 180 and 182 which are connected in series between the lead 178 and the grid. A filtering capacitor 184 is connected between ground and the junction of the resistors 180 and 182. It will be seen that a small bypass or filtering capacitor 186 is connected across the resistor 182, to bypass any sharp spikes or other high frequency components which may be received with the squeeze timer output signal.

The biasing circuit 172 is also employed to bias the electronic switching triode 144. Thus, a resistor 188 is connected between the cathode of the triode 144 and the lead 178. This resistor 188 functions as the cathode load resistor of the triode 144. The cathode current of the triode 144 flows through the resistor 188 and the diode 174 to ground.

It will be seen that the output of the electronic switch 122 is connected from the cathode of the triode 144 to the weld timer 26 by a lead 190. In order for this output to be sufficient to initiate operation of the weld timer 26, two conditions must exist. First, the output of the squeeze timer 24 must have reached a sufficient level to actuate the weld timer 26. Second, the power line voltage must be equal to or greater than the desired minimum level. When the power line voltage is insufficient, the triode 144 is operated as a starved cathode follower, having insufficient plate voltage to actuate the weld timer 26, no matter how high the squeeze voltages rises. The plate voltage for the triode 144 is derived from a voltage divider 192 which is connected between the plate voltage supply lead 194 and ground. A positive plate voltage is provided on the lead 194 by a diode rectifier 196 which is connected between the ungrounded side of the secondary winding 170 and the lead 194, through a small current limiting resistor 198. A large filter capacitor 200 is connected between the lead 194 and ground.

The voltage divider 192 comprises resistors 202, 204, 206, and 208 connected in series between the plate supply lead 194 and ground. The plate of the triode 144 is connected to the junction between the resistors 202 and 204, so that only about half of the full plate voltage is initially applied to the plate of the triode 144.

The plate voltage on the triode 144 is adapted to be raised to nearly the full available value by a Thyratron gaseous discharge tube 210 which is included in the electronic switching circuit 122. The plate of the Thyratron 210 is connected to the plate supply lead 194 through a resistor 212 of small value. It will be seen that the voltage divider resistor 206 is in the form of a variable potentiometer, having a movable contact 214 which is connected to the cathode of the Thyratron 210. When the Thyratron 210 conducts, nearly the full plate potential appears at the cathode of the Thyratron. This potential is applied to the plate of the triode 144 through the upper portion of the potentiometer 206 and the resistor 204. The voltage drop through these resistors is low, because the voltage divider current is shunted around the resistors through the Thyratron 210. It will be seen that a filtering capacitor 218 is connected between the plate of the triode 144 and the cathode of the Thyratron 210.

The output of the voltage comparator circuit 120 is applied to the shield grid of the Thyratron 210. Thus, load resistors 220 and 222 are connected in series between the cathode of the triode 126 and ground. The resistor 222 is variable to provide for initial calibration. A coupling capacitor 224 is connected between the cathode of the triode 126 and the shield grid of the Thyratron 210. It will be seen that a high value resistor 226 is connected between the shield grid and the cathode of the Thyratron 210.

The output of the triode 144 is connected from the cathode of the triode to the grid of the Thyratron 210 through a high value resistor 228.

The relay 158 performs the function of rendering the Thyratron 210 non-conductive after the welding cycle has been completed. Thus, the relay contacts 162 are connected in series with a capacitor 232 between the plate of the Thyratron 210 and ground. To provide for discharging of the capacitor 232, a resistor 234 is connected across the capacitor. Closure of the relay contacts 162 momentarily reduces the plate voltage on the Thyratron 210 to zero, while the capacitor 232 is charging through the resistor 212. The Thyratron is thus given an opportunity to deionize.

When the Thyratron 210 starts to conduct, the voltage on the cathode of the Thyratron increases abruptly. This increase is employed to provide the lockout triggering signal, which is routed to the reference generator 18, and thence to the other load control units, to lockout the operation of the other load control units for a brief interval. It may be considered that the Thyratron 210 is included in the pulse generating circuit 124. To provide a spike type lockout signal, as shown by the wave form 30, the square wave form at the cathode of the Thyratron is differentiated by a circuit comprising a capacitor 238 and a resistor 240 connected between the cathode of the Thyratron 210 and ground. The spike type signal 30 is developed across the resistor 240. A diode 242 is connected from the resistor 240 to the lockout signal line 22, so that the lockout signal pulse 30 will be transmitted from the load control unit to the lockout signal line 22, which runs to the other load control units and the reference generator 18. The diode 242 prevents lockout signals from the other load control units from being transmitted to the cathode of the Thyratron 210. A small filtering capacitor 244 is connected between ground and the cathode of the Thyratron 210.

It may be helpful to summarize the operation of the welding control system 10. As already indicated, the output signal from each squeeze control timer 24 rises as indicated by the wave form 34, along a typical condenser charging curve. This voltage is applied to the grid of the Thyratron 150. When the squeeze voltage has risen part way up the curve 34, the voltage becomes sufficient to render the Thyratron 150 conductive. This applies plate voltage to the triode 126 of the voltage comparator circuit 120.

The alternating voltage from the transformer secondary 132 is being applied continuously to the grid of the comparator triode 126. The reference voltage on the line 20 is also applied to the grid, in series with the alternating voltage, so as to bias the grid to a fairly high negative value. If the line voltage is sufficiently high, the triode 126 will conduct on the positive peaks of the alternating voltage from the transformer winding 132. Thus, positive pulses will be produced at the cathode of the triode 126. These positive pulses are applied to the shield grid of the Thyratron 210 in the electronic switching circuit 122.

The output of the squeeze timer 24 is applied to the grid of the triode 144. The output from the cathode of the triode 144 is fed to the weld timer 26. However, unless the Thyratron 210 is rendered conductive, the plate voltage on the triode 124 is insufficient to develop an output that will actuate the weld timer 26. Of course, the cathode output voltage from the triode 144 cannot exceed the plate voltage. As long as the Thyratron 210 is non-conducting, the cathode output voltage of the triode 144 rises along the curve 250 shown in broken lines in FIG. 4, and approaches a voltage $e_i$ which is insufficient to actuate the weld timer 26. When the Thyratron 210 is rendered conductive, the voltage at the cathode of the triode 144 rises abruptly, as shown at 252 in FIG. 4, so that it exceeds the voltage $e_f$ at which the weld timer 26 will fire.

It will be recalled that the output of the triode 144 is applied to the control grid of the Thyratron 210, while the output of the comparator triode 126 is applied to the shield grid of the Thyratron 210. Thus, the Thyratron 210 will be fired when both the output of the triode 144 and the output of the comparator triode 126 rise to sufficiently high levels. If the power line voltage is below the desired minimum level, the output of the comparator triode 126 will be insufficient to fire the Thyratron 210. Thus, the firing of the weld time 26 will be delayed until the power line voltage has increased above the desired minimum level.

When the Thyratron 210 fires, the plate voltage of the triode 144 is increased abruptly. The resulting increase of the voltage at the cathode of the triode 144 causes the weld timer 26 to fire.

The firing of the Thyratron 210 produces a square wave front which is differentiated by the capacitor 38 and the resistor 240 to provide the spike type triggering signal 30 on the lockout signal line 22. As will be explained presently, this pulse is employed to lockout the operation of the other load control unit 16.

After an extended interval, sufficient to provide for completion of the welding cycle, the squeeze voltage output returns to zero or even goes negative, as shown at 36 in FIG. 4. This causes the Thyratron 150 to become non-conductive. Inasmuch as the plate of the Thyratron 150 is supplied with alternating current, this Thyratron deionizes when the plate voltage drops to zero during the normal course of the alternating current cycle. The deionization of the Thyratron 150 allows the relay 158 to drop out. As a result, the relay contacts 162 resume their normally closed position. Thus, the capacitor 232 is connected between ground and the plate of the Thyratron 210. This momentarily reduces the plate voltage on the Thyratron 210 to zero, so that it, too, can deionize. At this point, the squeeze voltage is virtually zero, so that the Thyratron 210 will not again be rendered conductive until the completion of the next squeeze cycle.

As already indicated, the lockout triggering signal is employed to impose a momentary delay upon operation of the other load control units 16. This signal might be routed directly to the other load control units. However, it is preferred to route the lockout signal to the reference generator 18, so that a lockout pulse may be superimposed upon the reference voltage. It will be recalled that the pulse generator 60 generates the lockout pulse 32 in response to the spike type triggering signal 30. The modulator 62 superimposes the lockout pulse upon the reference voltage. The lockout pulse is negative in polarity, so that the reference voltage is increased substantially for the duration of the lockout pulse. Thus, in all of the load control units, the lockout pulse increases the bias on the comparator triodes 126. This increase in bias is sufficient to eliminate or greatly reduce the output from the comparator triode so that the alternating grid voltage component, derived from the line voltage, will be insufficient to render the electronic switch 122 capable of transmitting signals. The lockout pulse may be quite brief, amounting to only about two cycles of the alternating current, for example. However, this brief interval is sufficient to provide for dissipation of surges, switching transients or the like which may be caused by bringing one of the welding units onto the power line. After this brief delay, another welding unit can come onto the line. It will be apparent that as many as thirty welding units can come onto the line successively in one second, provided that the line voltage does not drop below the desired minimum value.

Any of the load control units 16 can be given a higher priority by adjusting the potentiometer 134 to provide a higher alternating voltage from the transformer winding 132. However, this has the effect of reducing the minimum level of line voltage at which the electronic switching arrangement 122 will actuate the weld timer 26. Thus, the priority adjustment is limited by the necessity of maintaining the quality of the welds produced by the machine.

The present welding control system is designed to operate with a squeeze timer having a gradually rising output signal. However, it will be realized that the system may readily be arranged to operate with a simple on-off type of squeeze output signal, such as might be produced by a relay, or a staircase type of signal, such as might be produced by a counter type of timer.

The present load control units employ electron discharge tubes in the various control circuits. However, it will be realized that the circuits may be arranged to utilize transistors, relays, or other electrically operable control devices. With these modifications, the effect of the welding control system will be the same, to insure that there is sufficient power line voltage before any welding machine is brought onto the power line, and to bring the welding machines onto the power line one at a time, with a very brief delay between the firing of the successive welders. It will be realized that the present invention is applicable to various other types of electrically operable machines, in addition to electric spot welders.

The control system of the present invention is capable of obtaining the maximum production from a group of welding machines, consistent with the maintenance of acceptable quality in the welds produced by the machines. The present control system reduces the peak demand placed on the power line by a group of electric welders or the like. Thus, with the use of the present system, additional welders may often be added to a group without overtaxing the capacity of the electrical distribution system. By making the existing distribution system operate more efficiently, the present system can eliminate any need for costly expansion of the distribution system.

It should be noted that the present system achieves mutually exclusive operation of switch tubes 210. Assume reference voltage as constant and all cathodes of tubes 210 tied together. This would provide a control system in which only one welder could fire at a time, because conduction of any one switch tube 210 would raise the cathodes of all others and keep them cut off, for the duration of that welder's entire work cycle. To avoid this limitation, the illustrated system effects lockout of the other switch tubes 210 for a limited period by using the switching of any tube 210 to trigger a lockout pulse in the reference voltage. This arrangement provides mutual exclusive operation for a short period (2 to 6 cycles).

Various other modifications, alternative constructions and equivalents may be employed without departing from the true spirit and scope of the invention, as exemplified in the foregoing description and defined in the following claims.

I claim:

1. In a welding control system, the combination comprising a plurality of welding machines, each machine having a squeeze timer for timing the interval during which the work pieces are held together prior to actual welding, a weld timer for timing the flow of welding current through the work pieces, and a hold timer for timing the interval during which the work pieces are held together after the flow of welding current has ceased, a plurality of load control units corresponding to said welding machines, each of said load control units being connected between the squeeze timer and the weld timer of the corresponding welding machine for controlling the initiation of the operation of the weld timer by said squeeze timer, said weld timer being coupled to said hold timer and being adapted to initiate the operation thereof, each of said welding machines having a commercial power line input for supplying power thereto, each of said load control units being connected to said commercial power line input, a reference generator having a regulated reference power supply for producing a constant reference voltage, a reference line extending from said reference generator to all of said load control units for transmitting a reference voltage to said load control units, each of said load control units having gate means for controlling the transmission of timing signals from said squeeze timer to said weld timer, comparator means for comparing the power line voltage with said reference voltage, and means operable by said comparator means for opening said gate means to transmission of signals when said power line voltage exceeds a desired minimum level, said load control unit having means for adjusting said minimum level, each of said load control units having means for generating a trigger pulse when said gate means is opened, a control line connected from said reference generator to all of said load control units for carrying trigger pulses from said load control units to said reference generator, said reference generator including pulse generating means for generating a control pulse of predetermined duration and magnitude in response to any trigger pulse received from any of said load control units, said reference generator comprising means for superimposing said control pulse upon said reference voltage, said control pulse thereby being effective to increase said reference voltage for the duration of said control pulse so that the opening of said gate means in one of said load control units will keep the gate means in all of the other of said load control units in a closed condition, said control pulse being of short duration to provide for the dissipation of switching transients due to initiation of welding current in said one welding machine.

2. Control apparatus, comprising an electrically operable device having a commercial power line input, said device requiring a minimum level of power line voltage for satisfactory operation, control means for initiating the operation of said electrically operable device, a load control unit connected between said control means and said device for controlling the operation of said device by said control means, said load control unit being connected to said power line input, reference means for generating a reference voltage of a substantially constant value which is not subject to changes due to fluctuations in the power line voltage, said load control unit comprising gate means for controlling the transmission of signals from said control means to said electrically operable device, comparator means for comparing power line voltage with said reference voltage, and means operable by said comparator means for opening said gate means to the transmission of signals when the power line voltage exceeds the predetermined minimum level, said load control unit having means for adjusting the level of power line voltage at which said gate means are opened.

3. In an electrical system, the combination comprising a plurality of electrically operable machines each of said machines having an electrical power line input for receiving electrical power from a power line to operate said machine, said machine requiring a minimum level of power line voltage for proper operation, each of said machines having control means for initiating the operation thereof, each of said machines having a load control unit connected between said control means and the corresponding machine, said load control unit being connected to said power line input, a reference generator for producing a substantially constant reference voltage which is not subject to changes due to variations in the power line voltage, a reference line for transmitting said reference voltage from said reference generator to all of said load control units, each of said load control units having a transmission device for controlling the transmission of control signals from said control means to the corresponding machine, comparator means for comparing the power line voltage with said reference voltage, and means operable by said comparator means for opening said transmission means to the transmission of signals when the power line voltage exceeds a desired minimum level, each of said load control units having means for producing a lockout signal when said transmission means is opened, and lockout means connected to all of said load control units and operative in response to a lockout signal from any one of said load control units for momentarily locking out the operation of all of the other of said load control units to provide for dissipation of switching transients on said power line.

4. In an electrical system, the combination comprising a plurality of electrical operable machines having power line inputs for supplying power thereto, each of said machines requiring a minimum level of power line voltage for proper operation, each of said machines having control means for initiating the operation thereof, each of said machines having a load control device connected between said control means and said machine, said load control device being connected to said power line input, reference means for producing a stable reference voltage which is not subject to changes due to fluctuations in the power line voltage, said reference means connected to all of said load control devices, each of said load control devices including transmission means for controlling the transmission of signals from said control means to the corresponding machine, comparator means for comparing the power line voltage with said reference voltage, and means for opening said transmission means to the transmission of signals when the power line voltage exceeds a desired minimum level, and lockout means operable by the opening of the transmission means in any one of said load control devices for preventing for a brief interval the opening of the transmission means in all of the other of said load control devices.

5. In a welding system, the combination comprising a plurality of electrically operable welding machines, each of said machines having a power line input for supplying electrical power thereto, each of said welding machines having control means for developing a signal adapted to initiate the flow of welding current in said machine, each of said welding machines having a load control device connected between said control means and said machine, said load control device being connected to said power line input, a reference generator connected to all of said load control devices and producing a stable reference voltage which is not subject to changes due to variations in the power line voltage, each of said load control devices comprising comparator means for comparing the power line voltage with said reference voltage, electronic switch means connected between said control means and said welding machine for controlling the transmission of signals therebetween, means operable by said comparator means for rendering said electronic switch means capable of transmitting signals when the power line voltage exceeds a desired minimum level, and means for generating a control pulse when said electronic switching means is rendered capable of transmitting signals, said reference means comprising lockout means connected to all of said load control devices for receiving control pulses therefrom, said lockout means including means for applying a lockout pulse to said reference voltage in response to reception of a control pulse from any of said load control devices so as to lock out the operation of the electronic switching means on all of the other of said load control devices for a brief interval sufficient to dissipate the effects of switching transients on the power line voltage.

6. Control apparatus, comprising an electrically operable device having a power line input, said device requiring a minimum level of power line voltage for satisfactory operation, control means for initiating the operation of said electrically operable device, load control apparatus connected between said control means and said device for controlling the operation of said device by said control means, said load control apparatus being connected to said power line input, reference means for generating a reference voltage of a substantially constant value which is not subject to changes due to fluctuations in the power line voltage, said load control apparatus comprising gate means for controlling the transmission of signals from said control means to said electrically operable device, comparator means for comparing power line voltage with said reference voltage, and means operable by said comparator means for opening said gate means to the transmission of signals when the power line voltage exceeds the predetermined minimum level.

7. In a welding system, the combination comprising a plurality of electrically operable welding machines, each of said machines having a power line input for supplying electrical power thereto, each of said welding machines having control means for developing a signal adapted to initiate the flow of welding current in said machine, each of said welding machines having a load control device connected between said control means and said machine, said load control device being connected to said power line input, a reference generator connected to all of said load control devices and producing a stable reference voltage which is not subject to changes due to variations in the power line voltage, each of said load control devices comprising comparator means for comparing the power line voltage with said reference voltage, electrically operable switch means connected between said control means and said welding machine for controlling the transmission of signals therebetween, means operable by said comparator means for rendering said switch means capable of transmitting signals when the power line voltage exceeds a desired minimum level, and means for generating a control signal when said switching means is rendered capable of transmitting signals, said reference means comprising lockout means connected to all of said load control devices for receiving control signals therefrom, said lockout means including means for applying a lockout pulse to said reference voltage in response to reception of a control signal from any of said load control devices so as to lock out the operation of the switching means on all of the other of said load control devices for a brief interval sufficient to dissipate the effects of switching transients on the power line voltage.

8. In a welding control system, the combination comprising a plurality of welding machines, each machine having a squeeze timer for timing the interval during which the work pieces are held together prior to actual welding, and a weld timer for timing the flow of welding current through the work pieces, a plurality of load control units corresponding to said welding machines, each of said load control units being connected between the squeeze timer and the weld timer of the corresponding welding machine for controlling the initiation of the operation of the weld timer by said squeeze timer, each of said welding machines having a commercial power line input for supplying power thereto, each of said load control units being connected to said commercial power line input, a reference generator having a reference power supply for producing a constant reference voltage, a reference line extending from said reference generator to all of said load control units for transmitting a reference voltage to said load control units, each of said load control units having gate means for controlling the transmission of timing signals from said squeeze timer to said weld timer, comparator means for comparing the power line voltage with said reference voltage, and means operable by said comparator means for opening said gate means to transmission of signals when said power line voltage exceeds a desired minimum level, each of said load control units having means for generating a trigger signal when said gate means is opened, a control line connected from said reference generator to all of said lead control units for carrying trigger signals from said load control units to said reference generator, said reference generator including pulse generating means for generating a control pulse of predetermined duration and magnitude in response to any trigger signal received from any of said load control units, said reference generator comprising means for superimposing said control pulse upon said reference voltage, said control pulse thereby being effective to increase said reference voltage for the duration of said control pulse so that the opening of said gate means in one of said load control units will keep the gate means in all of the other of said load control units in a closed condition, said control pulse being of short duration to provide for the dissipation of transients due to initiation of welding current in said one welding machine.

9. In an electrical system, the combination comprising a plurality of electrically operable machines, each of said machines having an electrical power line input for receiving electrical power from a power line to operate said machine, said machine requiring a minimum level of power line voltage for proper operation, each of said machines having control means for initiating the operation thereof, each of said machines having a load control device connected between said control means and the corresponding machine, said load control device being connected to said power line input, a reference generator for producing a substantially constant reference voltage which is not subject to changes due to variations in the power line voltage, a reference line for transmitting said reference voltage from said reference generator to all of said load control devices, each of said load control devices having a transmission device for controlling the transmission of control signals from said control means to the corresponding machine, comparator means for comparing the power line voltage with said reference voltage, and means operable by said comparator means for actuating said transmission means when the power line voltage exceeds a desired minimum level, each of said load control devices having means for producing a lockout signal when said transmission means is actuated, and lockout means connected to all of said load control devices and operative in response to a lockout signal from any one of said load control devices for momentarily locking out the operation of all of the other of said load control devices to provide for dissipation of switching transients on said power line.

10. In an electrical welding system, the combination comprising a plurality of electrically operable welding machines having power line inputs for supplying power thereto, each of said machines requiring a minimum level of power line voltage for proper operation, each of said machines having control means for initiating the operation thereof, each of said machines having a load control device connected between said control means and said machine, said load control device being connected to said power line input, reference means for producing a stable reference voltage which is not subject to changes due to fluctuations in the power line voltage, said reference means connected to all of said load control devices, each of said load control devices including transmission means for controlling the transmission of signals from said control means to the corresponding machine, comparator means for comparing the power line voltage with said reference voltage, and means for actuating said transmission means when the power line voltage exceeds a desired minimum level, and lockout means operable by the actuation of the transmission means in any one of said load control devices for preventing for a brief interval of the actuation of the transmission means in all of the other of said load control devices.

11. Control apparatus, comprising an electrically operable device having a power line input, said device requiring a minimum level of power line voltage for satisfactory operation, control means for initiating the operation of said electrically operable device, load control apparatus connected between said control means and said device for controlling the operation of said device by said control means, said load control apparatus being connected to said power line input, reference means for generating a reference voltage of a substantially constant value which is not subject to changes due to fluctuations in the power line voltage, said load control apparatus comprising gate means for controlling the transmission of signals from said control means to said electrically operable device, comparator means for comparing the power line voltage with said reference voltage, and means operable by said comparator means for rendering said gate means operative to transmit said signals when the power line voltage exceeds the predetermined minimum level.

12. Control apparatus, comprising an electrically operable device having a power line input, said device requiring a minimum level of power line voltage for satisfactory operation, control means for initiating the operation of said electrically operable device, load control apparatus connected between said control means and said device for controlling the operation of said device by said control means, said load control apparatus being connected to said power line input, reference means for generating a reference voltage for a substantially constant value which is not subject to changes due to fluctuations in the power line voltage, said load control apparatus comprising gate means for controlling the transmission of signals from said control means to said electrically operable device, comparator means for comparing the power line voltage with said reference voltage, and means operable by said comparator means for rendering said gate means operative to transmit said signals when the power line voltage exceeds the predetermined minimum level, said load control apparatus having means for adjusting the level of power line voltage at which said gate means is rendered operative to transmit said signals.

13. In an electrical system, the combination comprising a plurality of electrically operable devices having power line inputs for supplying power thereto, each of said devices requiring a minimum level of power line voltage for proper operation, each of said devices having control means for initiating the operation thereof, each of said electrically operable devices having a load control device connected between said control means and said electrically operable device, said load control device being connected to the corresponding power line input, reference means for producing a stable reference voltage which is not subject to changes due to fluctuations in the power line voltage, said reference means being connected to all of said load control devices, each of said load control devices including transmission means for controlling the transmission of actuating signals from said control means to the corresponding electrically operable device, comparator means for comparing the power line voltage with said reference voltage, and means for actuating said transmission means when the power line voltage exceeds a desired minimum level, and lockout means operable by the actuation of the transmission means in any one of said load control devices for preventing for a brief interval the actuation of the transmission means in all of the other of said load control devices.

14. Control apparatus, comprising an electrically operable device having a power line input for supplying electrical power thereto, said device requiring a minimum level of power line voltage for satisfactory operation, control means for initiating the operation of said electrically operable device, reference means for generating a reference voltage of a substantially constant value which is not subject to changes due to fluctuations in the power line voltage, transmission means for controlling the transmission of actuating signals from said control means to said electrically operable device, comparator means for comparing the power line voltage with said reference voltage, and means operable by said comparator means for rendering said transmission means operative to transmit said signals when the power line voltage exceeds the predetermined minimum level.

15. Control apparatus, comprising an electrically operable device having a power line input for supplying power thereto, said device requiring a minimum level of power line voltage for satisfactory operation, control means for initiating the operation of said electrically operable device, reference means for producing a stable reference voltage which is not subject to variations due to fluctuations in the power line voltage, comparator means for comparing the power line voltage with said reference voltage, and load control means connected to said control means and operable by said comparator means for enabling said control means to actuate said electrically operable device when the power line voltage exceeds the predetermined minimum level.

References Cited in the file of this patent

UNITED STATES PATENTS

| | | |
|---|---|---|
| 2,306,593 | Collom | Dec. 29, 1942 |
| 2,307,580 | Fluke | Jan. 5, 1943 |
| 2,920,242 | Koss | Jan. 5, 1960 |
| 3,037,151 | Cimerman et al. | May 29, 1962 |